United States Patent
Krall et al.

(10) Patent No.: US 6,585,403 B2
(45) Date of Patent: Jul. 1, 2003

(54) HAND-HELD MIXER HAVING SPEED SWITCHING MEANS AND HAVING DISENGAGING MEANS FOR MIXING TOOLS

(75) Inventors: Hans Peter Krall, Klagenfurt (AT); Donald Thackray, Groningen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 38 days.

(21) Appl. No.: 09/891,435

(22) Filed: Jun. 26, 2001

(65) Prior Publication Data

US 2002/0018398 A1 Feb. 14, 2002

(30) Foreign Application Priority Data

Jun. 27, 2000 (EP) .............................................. 00890199

(51) Int. Cl.[7] ................................................. A47J 43/07
(52) U.S. Cl. ....................................... 366/129; 366/344
(58) Field of Search ................................. 366/129, 197, 366/199, 206, 344, 601; 310/50, 68 A

(56) References Cited

U.S. PATENT DOCUMENTS

| 2,616,732 A | * | 11/1952 | Schwaneke |
| 2,705,619 A | * | 4/1955 | Lockwood |
| 2,737,371 A | * | 3/1956 | Gerry |
| 3,725,624 A | * | 4/1973 | Emmons |
| 4,620,796 A | * | 11/1986 | Moores |
| 5,803,598 A | * | 9/1998 | Harry et al. |
| 5,871,278 A | * | 2/1999 | Harry et al. |
| 6,079,865 A | * | 6/2000 | Plavcan et al. |
| 6,234,663 B1 | * | 5/2001 | Lecerf et al. |
| 2002/0051405 A1 | * | 5/2002 | Juriga et al. |

FOREIGN PATENT DOCUMENTS

| DE | 1654887 | * | 3/1971 | ................ 366/344 |
| DE | 3446970 | * | 6/1986 | ................ 366/129 |
| WO | WO9937195 | | 7/1999 | |

* cited by examiner

Primary Examiner—Charles E. Cooley
(74) Attorney, Agent, or Firm—Ernestine C. Bartlett

(57) ABSTRACT

A hand-held mixer (1) includes a drive mechanism (36) for driving mixing tools (28, 29, 30, 31, 32, 33, 34, 35), which mixing tools are detachably coupled to the drive mechanism (36) and are disengageable from the drive mechanism (36) with the aid of a movable disengaging device (42), and further includes speed switching circuits within a first module (9), with the aid of which speed switching circuits the speed of the mixing tools can be switched to different speed values. A movable actuating element (19) actuates the speed switching circuits and includes a switching handle (20). The disengaging device (42) and the actuating element (19) including the switching handle (20) are formed as a one-piece second module (44) which is arranged so as to be movable parallel to only one path of movement (43) both for actuation of the speed switching circuits and for disengagement of the mixing tools from the drive mechanism (36).

2 Claims, 2 Drawing Sheets

HAND-HELD MIXER HAVING SPEED SWITCHING MEANS AND HAVING DISENGAGING MEANS FOR MIXING TOOLS

BACKGROUND OF THE INVENTION

The invention relates to a hand mixer hand mixer having a housing, and having drive means, which are accommodated in the housing and which serve for rotationally driving two mixing tools, which mixing tools are detachably coupled to the drive means and are disengageable from the drive means, and having disengaging means, which are accommodated in the housing and which are movable between a rest position and a disengaging position and which serve for disengaging the mixing tools from the drive means, and having speed switching means, which are accommodated in the housing and which serve for switching the speed of the drive means and, consequently, of the mixing tools to different speed values, and having movable actuating means, which are accommodated in the housing and which include a switching handle and which serve for actuating the speed switching means.

Such a hand-held mixer of the type defined in the opening paragraph is known, for example from the patent document WO 99/37195 A1. The known hand-held mixer has movable actuating means in the area of a grip portion of the housing, which actuating means are mounted so as to be pivotable about a first axis and are also mounted so as to be pivotable about a second axis perpendicular to the first axis and have a control stick provided as a handle. The speed switching means can be influenced in order to switch to different speeds of the drive means and, consequently, of the mixing tools by a pivotal movement of the actuating means about the first axis, which movement is produced with the aid of the control stick. The disengaging means of the known hand-held mixer can be actuated with the aid of a pivotal movement of the actuating means about the second axis, which movement is produced with the aid of the control stick and causes the mixing tools to be disengaged from the drive means. In this case, the disengaging means are formed by a movably guided slider, which takes the form of a separate part and which is slidable with the aid of the pivotably mounted actuating means. The known hand-held mixer is consequently of a comparatively intricate construction. Furthermore, the operation of the known hand-held mixer is comparatively complicated because the pivotably mounted actuating means must be moved in a first pivoting direction for switching to different speeds of the mixing tools, while the pivotably mounted actuating means must be moved in a second pivoting direction perpendicular to the first pivoting direction for the disengagement of the mixing tools.

BRIEF SUMMARY OF THE INVENTION

It is an object of the invention to preclude the afore-mentioned problems and to provide an improved hand-held mixer and an improved switching means configuration. According to the invention, in order to achieve this object with a hand-held mixer of the type defined in the opening paragraph, the disengaging means and the actuating means including the switching handle are united to form a movable one-piece module, and the module is arranged so as to be movable parallel to only one path of movement both for the actuation of the speed switching means and for the disengagement of the mixing tools from the drive means, and the disengaging means of the module are movable into their disengaging position by means of the switching handle of the actuating means of the module.

The provision of the characteristic features in accordance with the invention results in a particularly simple construction as regards the change-over to different speeds of the mixing tools and the disengagement of the mixing tools from the drive means. Furthermore, this guarantees a simple operation because both the change-over to different speeds of the mixing tools and the disengagement of the mixing tools from the drive means can be effected by moving only one single handle parallel to only one single path of movement.

With a hand-held mixer in accordance with the invention it has proved to be particularly advantageous when, in addition, the actuating means is formed as an arcuate slider, path of movement of the one-piece slider is arcuate, and the disengaging means include two disengaging projections extending transversely to the slider. This has proved to be advantageous in view of an ergonomically most convenient and favorable construction.

The afore-mentioned aspects as well as further aspects of the invention will be apparent from the example of an embodiment described hereinafter and will be elucidated with reference to this example.

The invention will be described in more detail hereinafter with reference to an example of an embodiment which is shown in the drawings but to which the invention is not limited.

DETAILED DESCRIPTION OF THE INVENTION

Figure 1:
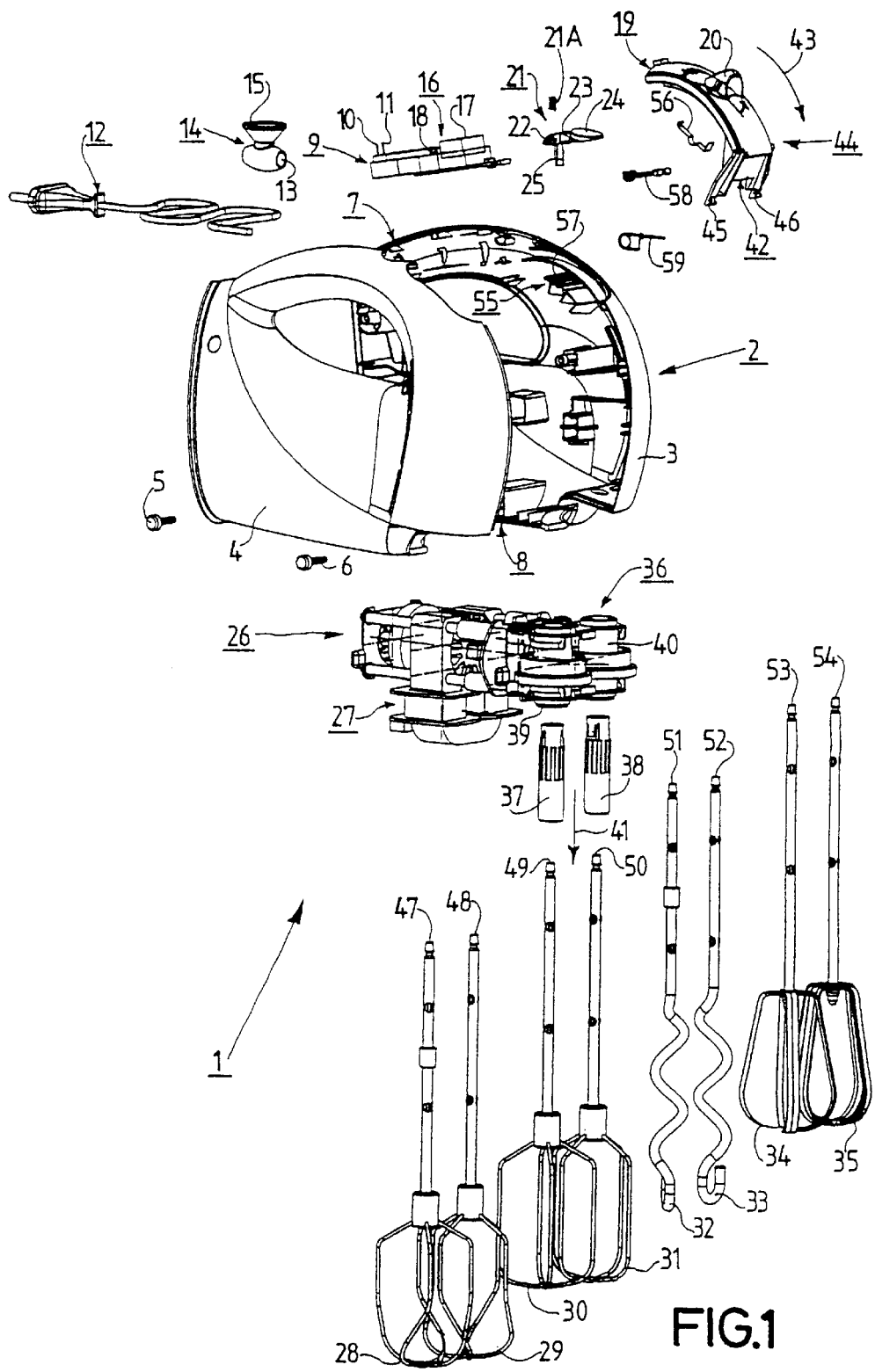
FIG. 1 is an exploded view of a hand-held mixer in accordance with an embodiment of the invention.
Figure 2:
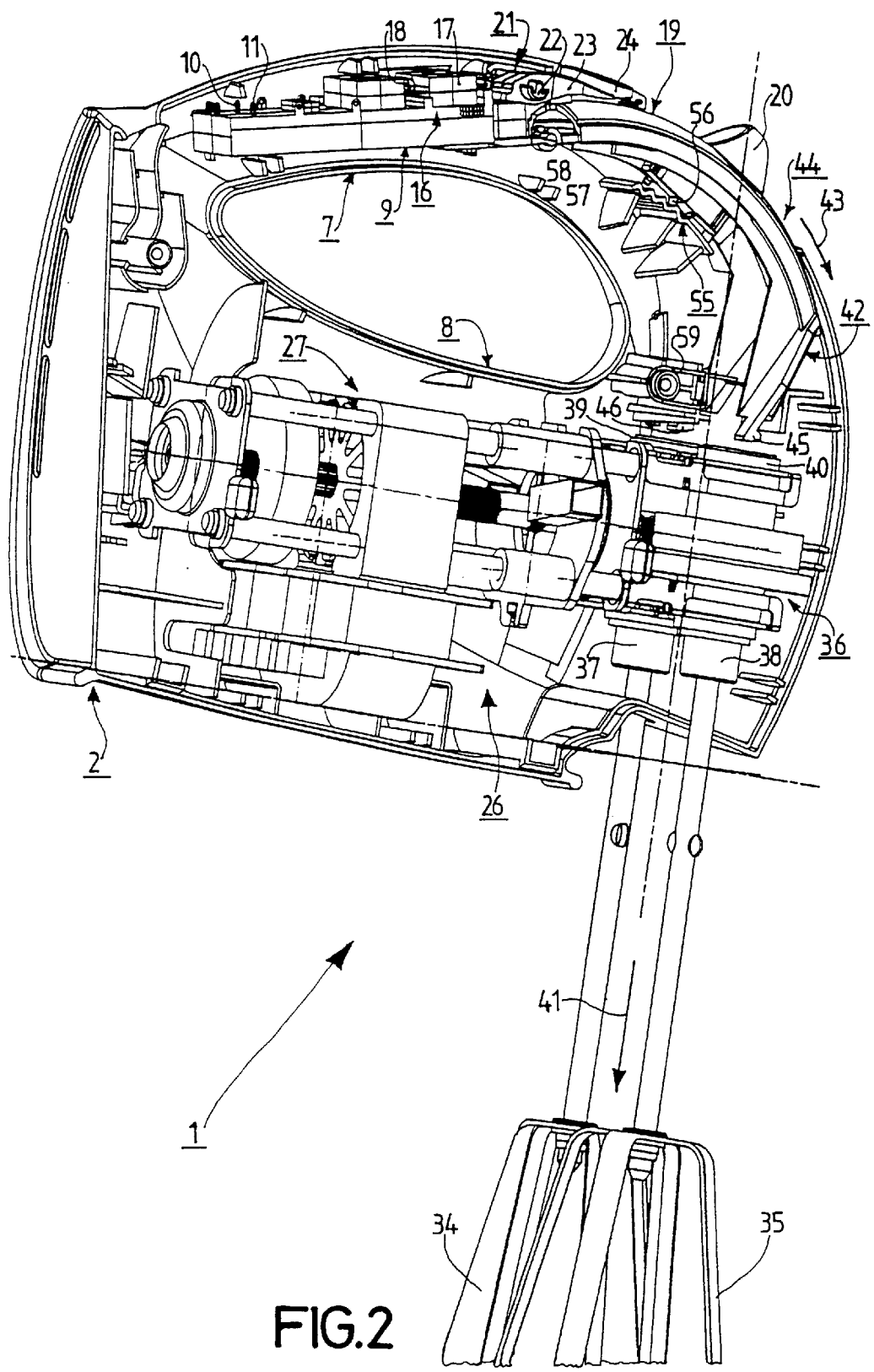
FIG. 2 is a side view of the hand-held mixer shown in FIG. 1, in which one housing section is not shown so as to expose the interior of the hand-held mixer.

FIG. 1 shows a hand-held mixer 1. The hand-held mixer 1 has a housing 2, which consists of two housing sections 3 and 4 held together with the aid of fastening means, which fastening means include two screws 5 and 6. The housing 2 has a grip portion 7, with the aid of which the hand-held mixer 1 can be held conveniently and simply with one hand in order to carry out a mixing process. The housing 2 further has a drive mounting portion 8, which mainly serves to accommodate a drive arrangement 26.

The grip portion 7 accommodates a first module 9. The first module 9 has two mains terminals 10 and 11 connected to a mains cord 12. The mains cord 12 is led through a passage 13 in a cord holder 14 having a suction cup 15 by means of which the cord holder 14 can be attached to the housing 2 of the hand-held mixer 1. The first module 9 further includes interference suppression means 16. The interference suppression means 16 consist of an interference suppression capacitor 17 and a resistor 18 arranged in parallel with the interference suppression capacitor 17. The interference suppression means 16 are connected to the two mains terminals 10 and 11 in an electrically conductive manner, i.e. they are arranged in parallel with the two mains terminals 10 and 11. The interference suppression means serve, in known manner, for interference suppression purposes.

The first module 9 further includes a switching means configuration, which is not shown in FIG. 1 and which includes speed switching means, which serve to switch the speed of a motor of the hand-held mixer 1 to different lower speed values, and which includes start means, which serve to start the motor of the hand-held mixer 1 at a higher speed. To actuate the speed switching means first movable actuating means 19 have been provided, which similarly to the first module are also accommodated in the grip portion 7 of the housing 2 and which include a first switching handle 20, which enables the speed switching means to be actuated. The first movable actuating means 19 are essentially formed by an arcuate slider 19. The slider 19 is guided so as to be movable along an arcuate path of movement 43, which is effected with the aid of guide ribs which are integral with the two housing sections 3 and 4 and which project from these two housing sections 3 and 4. The path of movement 43 is indicated by means of an arrow 43 in FIG. 1. The slider 19 is movable between five successive positions parallel to the path of movement 43, namely from a position "3" to a position "2" and further to a position "1" and then to a position "0" and from the last-mentioned position also into a position "Eject". The slider 19 can be locked in the positions "3", "2", "1" and "0" by means of a latching device 55, which consists of a latching spring 56, which is connected to the slider 19, and of a plurality of latching walls 57 connected to the housing section 3 and defining latching recesses. The slider is articulated to a rod 58, which in its turn is also articulated to the speed switching means of the first module 9.

In order to actuate the switching means in the first module 9 second movable actuating means 21 have been provided, which are essentially formed by a lever 21, which is mounted so as to be pivotable about a pivot 22, which lever has a second switching handle 24 on its one lever arm 23 and whose second lever arm 25 serves to actuate the start means. For the actuation of the start means the second switching handle 24 should be depressed against the force exerted by a return spring 21 A that acts upon the lever 21.

The drive mounting portion 8 of the housing 2 accommodates a drive arrangement 26, already mentioned. The drive arrangement 26 includes a motor 27, which serves to drive pairs of mixing tools 28 and 29, 30 and 31, 32 and 33, 34 and 35. The motor 27 can be brought into electrically conductive contact with the two mains terminals 10 and 11, namely via the switching means configuration, which includes the speed switching means and the start means. The motor 27 is configured to be powered from an a.c. mains. The motor 27 is further configured for driving at three lower speeds and for driving at one speed that is high with respect to the lower speeds. With the aid of the speed switching means it is thus possible to switch to one of the three lower speeds in the positions "3", "2" and "1" of the slider 19 and, in addition, to disconnect the motor 27 from the mains terminals 10 and 11 in the position "0" of the slider 19. The motor 27 can be started at the higher speed with the aid of the start means.

The drive arrangement 26 further includes drive means 36, which can be driven by means of the motor 27 via an intermediate gear. The intermediate gear comprises a drive worm, which can be driven by the motor shaft, and worm wheels, which mesh with the drive worm, which is common practice and is therefore not expanded on. The drive means 36 include two inner drive sleeves 37 and 38 accommodated in two outer drive sleeves 39 and 40. The drive means 36 serve for rotationally driving each time two mixing tools 28 and 29, 30 and 31, 32 and 33, 34 and 35. The mixing tools can be coupled detachably to the drive means 36 in pairs, namely to the inner drive sleeves 37 and 38 and can be ejected and thus detached, from the drive means 36, i.e. from the two inner drive sleeves 37 and 38, in their axial directions 41.

In order to detach the mixing tools 28 and 29, 30 and 31, 32 and 33, 34 and 35 from the drive means 36, disengaging means 42 are accommodated in the housing 2. The disengaging means 42 are movable between a rest position and a disengaging position. The disengaging means 42 are movable from their rest position into their disengaging position parallel to the path of movement 43.

In the hand-held mixer 1 the disengaging means 42 and the first movable actuating means 19 including the switching handle 20 are advantageously united to a movable and integral second module 44. The second module 44 is arranged so as to be movable parallel to only one path of movement, i.e. the path of movement 43, both in order to actuate the speed switching means included in the first module 9 and in order to disengage the mixing tools 28 and 29, 30 and 31, 32 and 33, 34 and 35 from the drive means 36. The disengaging means 42 of the second module 44 are then movable into their disengaging position by means of the switching handle 20 of the first actuating means 19 of the second module 44. Moreover, the construction in the present case is such that the disengaging means 42 project transversely from the slider 19 forming the first movable actuating means 19 and comprise disengaging projections 45 and 46 adapted to cooperate with the mixing tools 28 and 29, 30 and 31, 32 and 33, 34 and 35. When the disengaging means 42 are in the rest position the two disengaging projections 45 and 46 are disposed just above the free ends 47 and 48, 49 and 50, 51 and 52, 53 and 54 of the mixing tools 28 and 29, 30 and 31, 32 and 33, 34 and 35. By a movement of the second module 44 along the path of movement 43 the disengaging means 42 are movable from the rest position into the disengaging position, as a result of which the mixing tools 28 and 29, 30 and 31, 32 and 33, 34 and 35, which are coupled to the inner drive sleeves 37 and 38, are ejected from the drive means 36, i.e. disengaged from the drive means 36, in the direction indicated by the arrow 41. The movement of the second module 44 and the disengaging means 42 incorporated therein from the rest position into the disengaging position is effected against the force exerted by a return spring 59, which is formed by a wire spring which acts on the disengaging means 42 between the two disengaging projections 45 and 46.

The hand-held mixer 1 described hereinbefore has a particularly simple construction for switching to different speeds of the mixing tools 28 and 29, 30 and 31, 32 and 33, 34 and 35 and for the disengagement of the mixing tools from the drive means 36. Furthermore, a simple operation of the hand-held mixer 1 is achieved because switching to different speeds of the mixing tools as well as ejection of the mixing tools can be effected by means of a single switching handle 20, which advantageously should be moved only parallel to a single path of movement 43.

For the afore-mentioned speed switching means and start means reference may also be made to the European patent application bearing the application number 00890198.5 having the same priority date (PHAT000036 EP-P), incorporated herewith by reference.

What is claimed is:
1. A hand mixer (1) having;
a housing (2),
drive means (36), which are accommodated in the housing and which serve for rotationally driving two mixing tools (28, 29, 30, 31, 32, 33, 34, 35), which mixing tools (28, 29, 30, 31, 32, 33, 34, 35) are detachably coupled to the drive means (36) and are disengageable from the drive means (36), disengaging means (42), which are accommodated in the housing (2) and which are movable between a rest position and a disengaging position and which serve for disengaging the mixing tools from the drive means (36), speed switching means (60), which are accommodated in the housing (2) and which serve for switching the speed of the drive means (36) and, consequently, of the mixing tools (28, 29, 30, 31, 32, 33, 34, 35) to different speed values, and movable actuating means (19), which are accommodated in the housing (2) and which include a switching handle (20) and which serve for actuating the speed switching means (60), characterized in that the disengaging means (42) and the actuating means (19) including the switching handle (20) are united to form a movable one-piece module (44), the module (44) is arranged so as to be movable parallel to only one path of movement (43) both for the actuation of the speed switching means (60) and for the disengagement of the mixing tools (28, 29, 30, 31, 32, 33, 34, 35) from the drive means (36), and the disengaging means (42) of the module (44) are movable into their disengaging position by means of the switching handle (20) of the actuating means (19) of the module (44).

2. A hand-held mixer (1) as claimed in claim 1, characterized in that:

the actuating means (19) are essentially formed by an arcuate slider (19), the slider (19) is guided such that the path of movement of the module (44) is an arcuate path of movement (43), and the disengaging means (42) project transversely to the slider (19) and include two disengaging projections (45, 46) adapted to cooperate with the mixing tools (28, 29, 30, 31, 32, 33, 34, 35).

* * * * *